April 21, 1970  H. W. EHRENSPECK  3,508,278
SHORT BACKFIRE ANTENNA

Filed Feb. 28, 1968  3 Sheets-Sheet 1

INVENTOR.
HERMANN W. EHRENSPECK
BY Harry A. Herbert Jr
and
George Fine
ATTORNEYS April 21, 1970     H. W. EHRENSPECK     3,508,278
SHORT BACKFIRE ANTENNA Filed Feb. 28, 1968     3 Sheets-Sheet 2

INVENTOR.
HERMANN W. EHRENSPECK
BY Harry A. Herbert Jr
George Fine
ATTORNEYS

April 21, 1970 H. W. EHRENSPECK 3,508,278
SHORT BACKFIRE ANTENNA

Filed Feb. 28, 1968 3 Sheets-Sheet 3

INVENTOR.
HERMANN W. EHRENSPECK
BY Harry A. Herbert Jr.
George Fine
ATTORNEYS 3,508,278
SHORT BACKFIRE ANTENNA
Hermann W. Ehrenspeck, 94 Farnham St.,
Belmont, Mass. 02178
Filed Feb. 28, 1968, Ser. No. 708,910
Int. Cl. H01q 19/30, 19/10
U.S. Cl. 343—819
14 Claims

ABSTRACT OF THE DISCLOSURE

A directional antenna system in the form of a combination of a cavity-type antenna and a slow-wave endfire antenna to provide a slow-wave structure energized by an extremely efficient feed in the form of a cavity radiator.

BACKGROUND OF THE INVENTION

This invention relates generally to directional antennas and more particularly to a combination of cavity-type antenna serving as a feed and a slow-wave endfire antenna energized thereby.

In the prior art, there exist slow-wave endfire antennas, for example, a Yagi, a helix or double helix, a dielectric rod, or a disk-on-rod structure. Simultaneously there also exists a cavity antenna functionally and structurally similar to that of the reflection antennas described in pending U.S. patent application No. 446,128 filed Apr. 6, 1965, and now abandoned and also described in U.S. Patent Nos. 3,122,745 and 3,218,646 issued Feb. 25. 1964 and Nov. 16, 1965, respectively. However, there does does not exist a combination of the two aforementioned antennas. In addition thereto, the prior cavity-type antennas had limitations including bandwidth, and compactness.

SUMMARY OF THE INVENTION

In accordance with the present invention there is provided a directional antenna system which is obtained by combining two antenna types. One of them is a slow-wave endfire structure, the other is a cavity-type antenna whose configuration resembles a strongly modified Fabry-Perot cavity resonator similar to that used as part of a Laser. The function of the resulting new antenna type, referred to as "cavity-endfire antenna," is best described and analyzed by stating that its slow-wave endfire structure is energized by an extremely efficient feed in the form of the cavity radiator which alone has a higher gain than a five wavelengths long endfire antenna. Particular advantages of the cavity-endfire antenna are its low side and back lobes and its high gain which is obtained with minimal length and cross-section of the antenna structure.

In addition to the foregoing, the present invention also provides an improved cavity-type antenna with increased bandwidth and compactness. The addition of a tuning plate thereto increases the frequency bandwidth substantially over prior models permitting the utilization thereof in countermeasure operations. The combination of the Yagis and backfire design to make a smaller flat plate of the cavity-type antenna reduces the overall diameter of the structure where this kind of compactness can be traded for length. Finally, flush mounting techniques are described which are of very practical worth for supersonic aircraft and missiles.

An object of the invention is to provide a directional antenna system including the combination of a cavity-type antenna and a slow-wave antenna.

Another object of this invention is to provide a directional antenna system including the combination of an improved cavity-type antenna utilized in combination with a slow-wave antenna.

Yet another object of the present invention is to provide a directional antenna wherein a slow-wave structure is energized by an extremely efficient feed in the form of a cavity-type antenna.

The various features of novelty which characterize this invention are pointed out with particularity in the claims annexed to and forming part of this specification. For a better understanding of the invention, however, its advantages and specific objects obtained with its use, reference should be had to the accompanying drawings and descriptive matter in which is illustrated and described preferred embodiments of the invention.

BRIEF DESCRIPTION OF THE DRAWINGS

FIGURE 7b illustrates one cavity-type of antenna to be combined with the Yagi of FIGURE 7a;

DESCRIPTION OF THE PREFERRED EMBODIMENT

Figure 1:
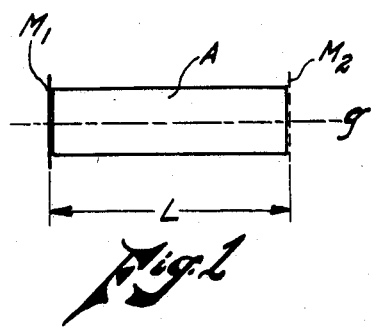
FIGURE 1 shows a modified version of a cavity resonator utilized to describe the cavity-type antenna of this invention.

Now to describe the theory of operation of the cavity-type antenna, the Fabry-Perot cavity resonator which is mainly used in optical interferometry, is a parallel-plate structure consisting of large perfectly reflecting walls. A modified version of this resonator has lately found wide application as a laser resonance cavity. A typical example is schematically shown in FIGURE 1. $M_1$ is a perfectly reflecting plate and $M_2$ a partially reflecting plate, both mounted exactly transversely to the longitudinal axis ($g$) of the structure and spaced many wavelengths apart. The space between $M_1$ and $M_2$ constitutes the cavity which for laser applications has to be filled with the active laser material A. The cavity length L has to be adjusted so that multiple reflection of the laser energy occurs in the space between $M_1$ and $M_2$. A portion of the cavity energy is radiated from the side of the partially reflecting plate $M_2$ with a pattern of extremely high directivity in the longitudinal axis ($g$) of the structure.

Figure 2:
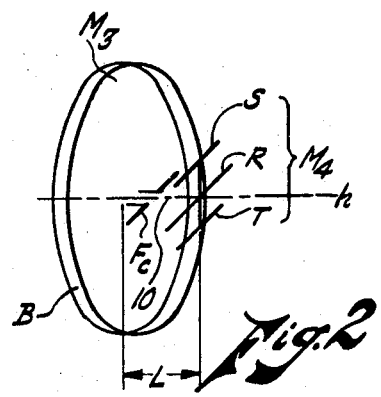
FIGURE 2 illustrates one extremely compact cavity-type antenna.

It has been found that a cavity configuration which is, in fact, a strongly modified version of that of FIGURE 1 can—without the active medium—be used as a very efficient cavity antenna and as such serve as the feed of the cavity-endfire antenna described in this invention. Unfortunately, the dimensions of FIGURE 1 cannot be simply scaled for any frequency range because they are, for most applications, prohibitively large in terms of wavelength. An extensive investigation of the field distribution inside the cavity has shown, however, that it can tolerate further modifications without losing its basic characteristics as a resonance cavity: its length may be drastically reduced to as little as one half of a wavelength; the area of plate $M_1$ which may be a planar reflector may be reduced to a few square wavelengths and the area of $M_2$ to about one quarter of a square wavelength; alternatively, plate $M_2$ may be in the form of and replaced by a row of simple rod reflectors spaced up to approximately one half wavelength from each other and arranged in the plane of $M_2$. As a result the extremely compact cavity antenna is obtained whose configuration is shown in FIGURE 2. It constitutes, in fact, the shortest possible cavity antenna of this type. $M_3$ marks a circularly shaped planar reflector—corresponding to $M_1$ in FIGURE 1—and $M_4$ a reflector combination consisting of three rod reflectors R, S, and T, which are arranged in a plane transverse to the longitudinal axis ($h$) of the antenna—corresponding to $M_2$ in FIGURE 1. Reflector $M_4$ may also be a planar disk of not more than $\frac{1}{10}$ of the area of $M_3$. The axial length L of the cavity which is terminated by the planes of $M_3$ and $M_4$, is about .50 wavelength. $F_c$ is the cavity feed. Its position, usually at a spacing of .25 wavelength from $M_3$, is not very critical and may for best input impedance matching of the antenna be moved nearer to or further away from $M_3$. The performance of this short cavity antenna is essentially improved by a rim B of approximately .25 to .50 wavelength width which surrounds $M_3$.

Figure 3:
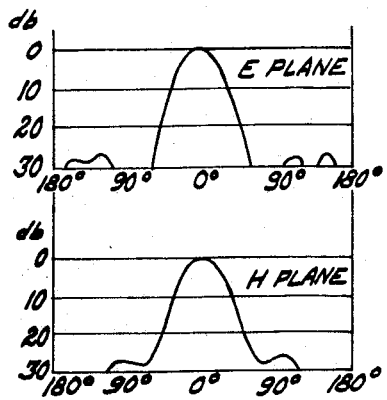
FIGURE 3 illustrates the measured E- and H-plan radiation patterns provided by the cavity-type antenna of FIGURE 2.

With a diameter of two wavelengths for $M_3$ and with optimum adjustment of all parameters the cavity antenna of FIGURE 2 yields a gain of more than 15 db above an isotropic source. The measured E- and H-plane radiation patterns are presented in FIGURE 3. All sidelobes are at least 20 db below the maximum in the E, as well as in the H plane, and the backlobe is more than 30 db below the maximum. The circular shape of the planar reflector $M_3$ is partly responsible for these exceptionally clean patterns, but square- or polygon-shaped reflectors which are easier to build also give satisfactory results for most practical applications.

The antenna configuration of FIGURE 2 is functionally and structurally similar to that of the reflection antennas described in Patents No. 3,122,745 and 3,218,646. At the time the patent application was submitted, however, it was not yet known that the key to the high-gain performance of this antenna type was the optimization of its cavity characteristics. This knowledge led to some essential improvements in construction and performance which were achieved by further modifications of the cavity configuration. Some of them are of special importance for the use of this cavity antenna as feed for the cavity-endfire antenna described in this invention. As described in an earlier invention disclosure also, a corner reflector may be used instead of the planar reflector $M_3$.

It has been found that for many applications rim B of reflector $M_3$ has to extend only in the direction of the polarization of the field. Therefore a square-shaped reflector $M_3$ of a linearly polarized cavity antenna requires the rim only along those edges which are parallel to the dipole feed, and a circularly-or polygon-shaped reflector $M_3$ only along two sectors approximately 90° wide. For a cavity antenna for crossed polarization, however, the rim must surround the entire periphery of reflector $M_3$.

The operating frequency range of a cavity antenna according to FIGURE 2 with a fixed cavity length L is limited. If, however, a variation of L is provided, for example by a mechanical adjustment of the spacing between $M_3$ and $M_4$ by rotating supporting rod 10 which is threaded to permit movement in or away from $M_3$, other cavities described hereinafter may be adjusted in the same manner. The cavity antenna can be tuned for optimum performance over that extended frequency range the feed is capable of. Moving $M_4$ towards $M_3$ results in optimum adjustment for higher frequencies, moving it away from $M_3$ for lower frequencies. With the usable bandwidth defined as that frequency range within which the antenna gain is approximately proportional to the area of the larger reflector $M_3$ and all side- and backlobes are at least 10 db below the maximum in the E- and H-plane patterns, the bandwidth of the optimized cavity antenna of FIGURE 2 is about 1.3:1 for a fixed cavity length L, and the antenna can be tuned within a frequency range of approximately 2:1 by adjusting the cavity length L.

It has been found, however, that the bandwidth of a cavity antenna with fixed cavity length L can be essentially increased if the reflector dimensions and the cavity length are optimized for different frequencies within the prescribed frequency range. In a practical model a bandwidth of about 1.7:1 was obtained by optimizing the reflectors $M_3$ and $M_4$ for the highest frequency and the cavity length for about ¾ of this frequency.

Figure 4:
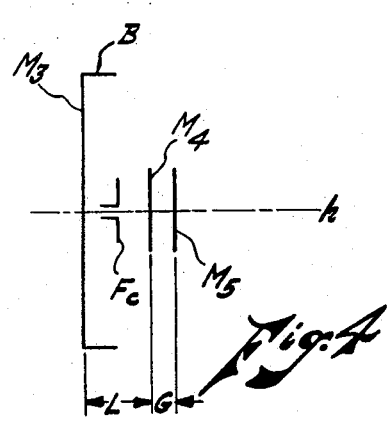
FIGURE 4 shows a second cavity-type antenna providing amongst other features a wider bandwidth.

A still wider bandwidth can be achieved with the antenna configuration of FIGURE 4. $M_3$, B, F, $M_4$, and L have the same meaning as in FIGURE 2. A third plane reflector $M_5$, in size and shape about the same as $M_4$, is arranged outside the cavity at a distance G from, and parallel to $M_4$. Because of the very complicated interaction of the various antenna parameters the optimal value of G—in general .25 to .50 times L—has to be determined experimentally. Of course, the cavity feed has to be feasible for the prescribed frequency range of the antenna. For a cavity antenna model with circularly shaped reflectors $M_3$, $M_4$, and $M_5$, for example, the following approximate dimensions (given relative to the wavelength $\lambda_m$ of the highest frequency) shield optimum performance over 2:1 bandwidth Diameter of $M_3 = 2.00\lambda_m$
Diameter of $M_4 = .50\lambda_m$
Diameter of $M_5 = .45\lambda_m$
Width of $B = .33\lambda_m$
Cavity length $L = .67\lambda_m$
Distance between $M_4$ and $M_5$: $G = .16\lambda_m$ It has been found that the wide-bandwidth performance of the cavity antenna of FIGURE 4 can be analyzed as the result of a combined application of three different antenna principles, each of them being dominant in a part of the 2:1 frequency range. With $f_h$ as the highest frequency, the antenna acts as a cavity antenna to about $0.8f_h$. The cavity effect gradually diminishes with decreasing frequency and, simultaneously, reflectors $M_4$ and $M_5$ approach their optimal dimensions as directors at about $0.7f_h$. In this frequency range the antenna acts as a two-disk array to about $0.6f_h$. For still lower frequencies the disks gradually lose their director characteristics, and the antenna finally acts to below $0.5f_h$ as a simple reflector antenna with the feed as the only effective element in front of reflector $M_3$.

Figures 5, 6, 6A:
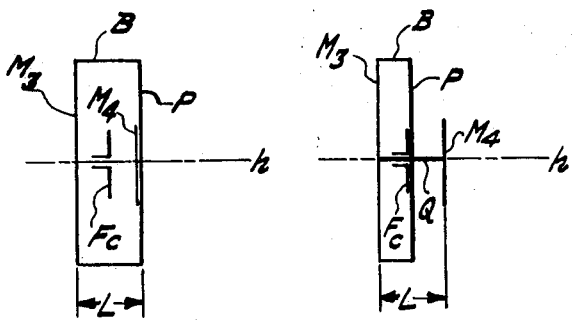
FIGURE 5 is a third cavity-type antenna which can also be mounted flush into a body.
FIGURE 6 shows a fourth cavity-type antenna which extends only about .25 wavelength into a body.
FIGURE 6a shows a front view of the cavity-type antenna of FIGURE 6.

FIGURE 5 is a sketch of a special type of cavity antenna which can also be mounted flush into a body. $M_3$, B, L, $F_c$, and $M_4$ have the same meaning as in FIGURE 2 with B extending, however, over the entire cavity length. P marks a dielectric plate which is parallel to $M_3$ and connected with the edge of rim B; it can at the same time support reflector $M_4$. The resulting antenna is a completely enclosed structure which can easily be made weather-resistant. As flush-mounted cavity antenna it extends only .50 wavelength into the space of a body. An experimental S-band model according to FIGURE 5 which was covered by a Plexiglas plate with reflector $M_4$ glued to its surface, showed a small increase in grain over a same size cavity antenna according to FIGURE 2, and a further reduction of its side- and backlobe level.

FIGURE 6 is a sketch of a cavity antenna which extends only about .25 wavelength into a body. All corresponding elements are marked in the same way as in FIGURE 5. The dielectric plate P is located in the plane of Feed $F_c$. The only element outside the enclosed structure is reflector $M_4$. It may be, as shown in FIGURE 6a, attached to the center of the dielectric plate P or the reflector $M_3$ by a metallic rod Q or may be supported by two sturdy rods which are connected with rim B. For linear polarization these two metal rods arranged transverse to the plane of polarization—shown in FIGURE 6a as dotted lines $Q_1$—may be used, for crossed polarization, however, the rods must be made from non-conductive material.

Figure 7A:
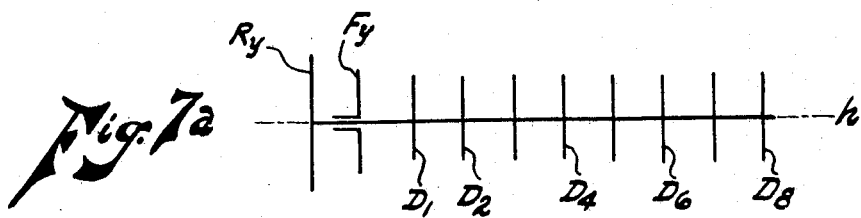
FIGURE 7a shows a slow-wave endfire antenna in the form of a Yagi which is utilized in combination in the present invention.
Figure 7B:
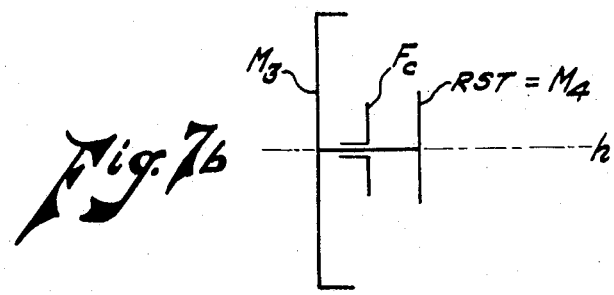
Figure 7C:
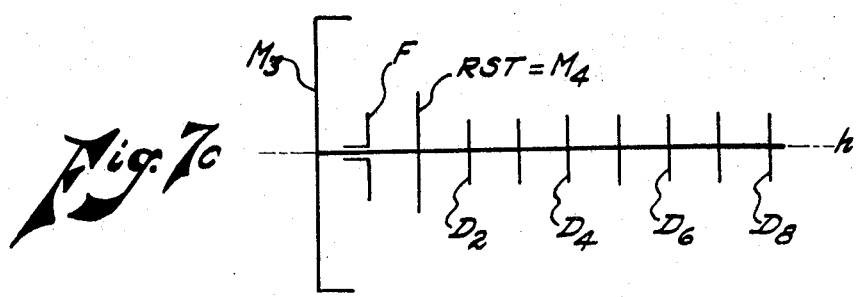
FIGURE 7c shows one preferred embodiment of the cavity-endfire antenna of the present invention.

To obtain the cavity-endfire antenna according to the invention anyone of the described configurations of cavity antennas can be combined with any one of the known types of slow-wave endfire antennas, for example, with a Yagi, a helix or double helix, a dielectric endfire rod structure, or a disk-on-rod structure. For the following discussions the Yagi was chosen as an example. It consists, in its simplest form shown in FIGURE 7a, of a dipole feed $F_y$, a single dipole reflector $R_y$, and a row of directors $D_1$ to $D_8$ forming the slow-wave structure. The working principle of this antenna type is sufficiently described in the literature. Its gain is a function of the length of the slow-wave structure provided that the directors are adjusted to their optimum height, and the feed-reflector combination $F_y$, $R_y$ is optimized for maximum directivity in the endfire direction. In FIGURE 7 is also shown how the cavity-endfire antenna of FIGURE 7c is created by nesting the feed end of the Yagi-type endfire of FIGURE 7a into the cavity antenna of FIGURE 7b. In all three figures the same elements are marked by the same letters as previously used. For simplicity in the drawings it is assumed that all spacings between reflectors, feeds, and directors of both antennas are the same; the nesting is then effected in such a way that feeds $F_y$ and $F_c$ coincide in F, $R_y$ is replaced by $M_3$ and the first of the directors, $D_1$, is replaced by the center reflector R. What is finally left of the Yagi is the slow-wave endfire structure (consisting of the directors $D_2$ to $D_8$) which now extends in front of the reflector combination R, S, T. The gain of the cavity-endfire antenna now increases as the length of the slow-wave structure is extended, provided that its phase velocity is progressively adjusted to the new optimum required by each particular length. It should be mentioned that the optimum phase velocity of the cavity-endfire antenna is, however, essentially different from that of an equal-length conventional endfire antenna. The principal radiating aperture which is now moved to the end of the slow-wave endfire structure can be widened and consequently the antenna gain somewhat increased if the slow-wave structure is tapered to lower director heights towards its open end.

From the procedure shown in FIGURE 7 it follows that it is also possible to increase the gain of an already existing Yagi by taking the following three steps. (1) Replacing reflector $R_y$ by a planar reflector $M_3$ of the specified size. (2) Replacing the first director of the Yagi $D_1$ by a reflector combination R, S, T or any other realization of $M_4$, for example a disk. (3) Decreasing the length of the directors of the Yagi to the proper height.

Figure 8:
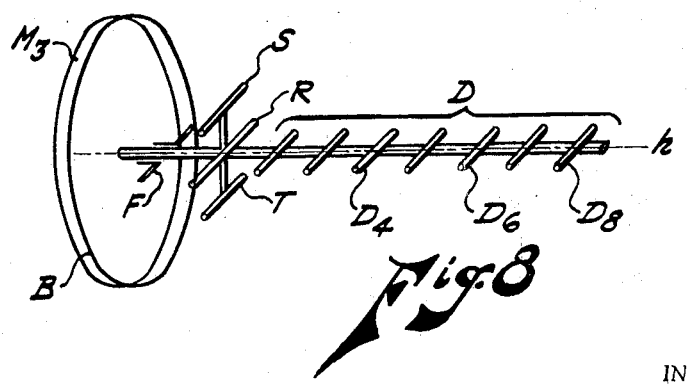
FIGURE 8 shows a second preferred embodiment of the cavity-endfire antenna.

FIGURE 8 is a sketch of a cavity-endfire antenna according to the invention, with a circularly shaped reflector $M_3$, a combination of three dipoles as reflector $M_4$ and seven directors, $D_2$ to $D_8$ (slow-wave endfire structure). The horizontal direction of the dipoles indicates that this antenna model is feasible for receiving or transmitting horizontal linear polarization. For vertical polarization all dipoles have to be arranged in vertical directions. For all other polarization angles feed F should be a crossed dipole, reflector $M_4$ a disk of about a half wavelength diameter, and the slow-wave structure a row of crossed dipoles or any other structure capable of receiving or transmitting the specified type of polarization.

Figure 9:
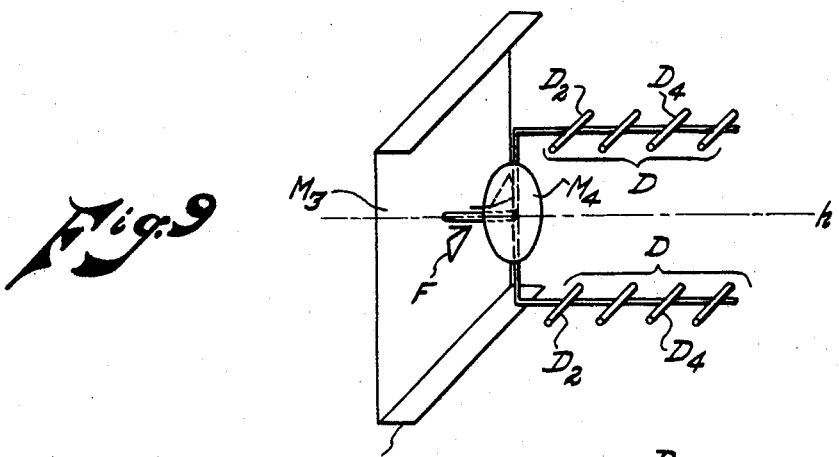
FIGURE 9 shows a third preferred embodiment of the cavity-endfire antenna with the two slow-wave structures, one above the other.
Figure 10A:
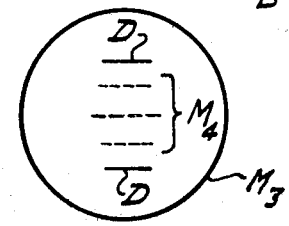
FIGURE 10a shows a front view of one of the arrangements of the combination cavity and slow-wave endfire antennas having two slow-wave structures, one above the other.
Figure 10D:
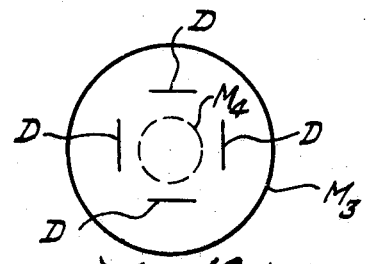
FIGURE 10d shows a front view of yet another one of the arrangements of the combination cavity and slow-wave endfire antennas having four slow-wave structures as indicated by solid lines.
Figure 10B:
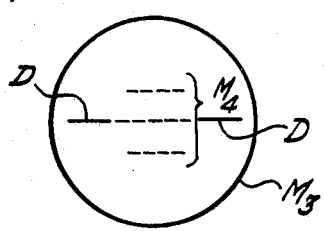
FIGURE 10b shows a front view of another one of the arrangements of the combination cavity and slow-wave endfire antennas having two slow-wave structures, side by side.
Figure 10E:
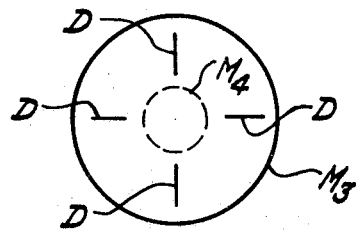
FIGURE 10e shows a front view of a further one of the arrangements of the combination cavity and slow-wave endfire antennas having four slow-wave structures as indicated by solid lines.
Figure 10C:
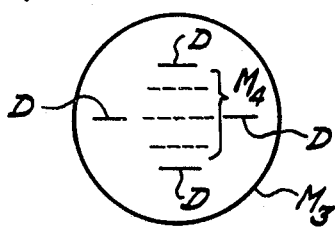
FIGURE 10c shows a front view of still another one of the arrangements of the combination cavity and slow-wave endfire antennas having two slow-wave structures, one above the other, and two side by side.

The length of the antenna of FIGURE 8 can be materially decreased without any loss in gain by placing two or more slow-wave endfire structures in front of the cavity, either one above the other or side-by-side or both ways. FIGURE 9 shows such an antenna configuration with two slow-wave endfire structures one above the other. All elements are again marked by the same letters as in the previous figures. $M_3$ is a square-shaped reflector which has its rim B extending only along two of its edges. F is a broadband bow-tie dipole. It should be mentioned that this arrangement of slow-wave structures in front of the cavity antenna has nothing in common with the well-known arrangement of two or more Yagis in front of a plane reflector. In such a conventional Yagi array each Yagi antenna is fed by a separate half-wavelength dipole, or every two Yagis by a full-wavelength dipole, and the slow-wave structures have to be arranged directly in front of their dipole feeds. In contrast, the two or more slow-wave structures of a cavity-endfire antenna are according to the invention energized by the radiation field of the cavity antenna and can be moved nearer to or further away from each other independent of the single cavity feed, thus changing the field distribution in the radiating aperature so as to obtain the desired shape of the radiation patterns.

The arrangement of the two slow-wave structures one above the other (FIGURE 9), or alternatively side by side, narrows the main beam of the radiation pattern in the vertical plane (H plane) or alternatively in the horizontal plane (E plane), leaving it practically unchanged in the other plane. If slow-wave structures are arrayed simultaneously one above the other and side by side, the patterns are narrowed in both planes. Some of the many possible arrangements are shown in FIGURE 10. The circles indicate the circularly shaped reflector $M_3$. The solid straight lines show the location and direction of dipole slow-wave structures, and the dashed lines the location and direction of the dipole-reflector combination R, S, T in FIGURES 10a–c and of the reflector disks $M_4$ in FIGURES 10d and e. The cavity feeds which are linear diploes in FIGURES 10a, b, c, and crossed dipoles in FIGURE 10d and e are not shown. While the configurations of FIGURES 10a, b, and c are for linear polarization, those in FIGURES 10d and e may be applied to any type of polarization the cavity feed is capable of, for example, for linear elliptical or circular polarization.

If two or more slow-wave structures are used the field distribution in the radiating aperature of the cavity endfire antenna can be changed by their spacing. Best results are obtained with tapered structures. In general, the increase in gain is proportional to the length and number of slow-wave structures, and the side- and backlobe level of the radiation patterns may be optimized by controlling the phase velocity and spacing of the slow-wave structures. It is noted that the slow-wave structures are labeled D in FIGURES 8, 9, and 10a–10e.

It is emphasized again that in the present invention, the cavity-type antenna that is utilized in combination with the slow-wave endfire structure operates in the resonant cavity concept and its dimensions must be chosen in accordance with the principles of open resonant cavities. To obtain highest gain at a pretermined frequency, the electric length of the cavity must be approximately any multiple, including unity, of half a wavelength. The diameter of the fully reflecting plate of FIGURE 2 must be large enough to set up the desirable resonant modes between the fully and partially reflecting plates of FIGURE 2, and cannot be so small that energy starts leaking out before reaching the "virtual aperture," i.e., the plane through the partially reflecting plate in FIGURE 2. The optimum was found to be approximately 2.2 wavelength diameter for a cavity length of one half of a wavelength. If for the same cavity length the diameter size is increased, the performance of the cavity-type antenna deteriorates. If, however, a larger cavity length, for example one wavelength, is chosen, the diameter size of the fully reflecting plate has to be increased for optimal antenna performance. While in accordance with the provisions of the statutes, I have illustrated and described the best forms of the invention now known to me, it will be apparent to those skilled in the art that changes may be made in the form of the apparatus disclosed without departing from the spirit of the invention as set forth in the appended claims, and that in some cases certain features of the invention may be used to advantage without a coresrponding use of other features.

Having now described my invention what I claim as new and desire to secure by Letters Patent, is as follows:

1. A cavity-endfire antenna system transmitting and receiving electromagnetic energy in the direction of the longitudinal axis thereof comprising a fully reflecting plate, a partially reflecting plate, both of said plates being mounted transversely to said longitudinal axis and spaced from each other to constitute an electromagnetic resonant cavity with the cavity length adjusted so that multiple reflection of said electromagnetic energy occurs in said space, antenna feed means interposed between said plates to energize said cavity, with a portion of the cavity energy being radiated by way of said partially reflecting plate with a radiation field pattern of extremely high directivity along said longitudinal axis, and slow-wave endfire structure means being positioned outside of said cavity adjacent to said partially reflecting plate, said endfire structure means having two ends, one of said ends being disposed in said radiation field pattern for efficient feeding thereof, and the other of said ends radiating electromagnetic energy in response to said feeding.

2. A cavity-endfire antenna system as described in claim 1 wherein said slow-wave endfire structure means coincides with said longitudinal axis.

3. A cavity-endfire antenna system as described in claim 1 wherein said slow-wave endfire structure means is parallel to and displaced from said longitudinal axis.

4. A cavity-endfire antenna system as described in claim 3 wherein said slow-wave endfire structure means is a first slow-wave endfire structure means displaced in the vertical direction, and further including a second slow-wave endfire structure means identical to said first but displaced in the vertical direction opposite to said first.

5. A cavity-endfire antenna system as described in claim 3 wherein said slow-wave endfire structure means is a first slow-wave endfire structure means displaced in the horizontal direction, and further including a second slow-wave endfire structure means identical to said first but displaced in the horizontal direction opposite to said first.

6. A cavity-endfire antenna system as described in claim 5 further including third and fourth slow-wave endfire structure means also identical to said first, said third and fourth being positioned vertically on either side of said longitudinal axis.

7. A cavity-endfire antenna system as described in claim 1 wherein said cavity length is approximately one-half wavelength, said fully reflecting plate is a circularly shaped planar reflector having a diameter of approximately two wavelengths, and said partially reflecting plate being also a circularly shaped planar reflector having a diameter of approximately a half of a wavelength.

8. A cavity-endfire antenna system as described in claim 1 wherein said partially reflecting plate is comprised of a row of rod reflectors spaced a predetermined distance from each other and arranged in the plane of said partially reflecting plate.

9. A cavity-endfire antenna system as described in claim 1 further including a reflecting rim surrounding said fully reflecting plate, said rim having a preselected width.

10. A cavity-endfire antenna system as described in claim 1 wherein said partially reflecting plate is a first partially reflecting plate, and further including a second partially reflecting plate interposed between said first partially reflecting plate and said slow-wave endfire structure means, said second plate also being parallel to said first plate and of substantially the same magnitude therewith.

11. A cavity-endfire antenna system as described in claim 1 further including means to vary said cavity length to provide optimum performance over a wide frequency range.

12. A cavity-endfire antenna system as described in claim 1 further including a reflecting rim having two edges, said rim surrounding said fully reflecting plate and connected to one of said edges, and a dielectric plate parallel to said fully reflecting plate connected to the other of said edges, said dielectric plate serving as a support for said partially reflecting plate.

13. A cavity-endfire antenna system transmitting and receiving electromagnetic energy in the direction of the longitudinal axis thereof comprising a fully reflecting plate, a first partially reflecting plate, both of said plates being mounted transversely to said longitudinal axis and spaced from each other to constitute an electromagnetic resonant cavity with the cavity length adjusted so that multiple reflection of said electromagnetic energy occurs in said space, antenna feed means interposed between said plates to energize said cavity, with a portion of the cavity energy being radiated by way of said first partially reflecting plate with a radiation field pattern of extremely high directivity along said longitudinal axis, and a second partially reflecting plate positioned adjacent and parallel to said first partially reflecting plate at a preselected distance therefrom to provide broadband performance.

14. A cavity-endfire antenna system as described in claim 13 wherein said fully reflecting plate includes a reflecting rim of preselected width surrounding and connected thereto.

References Cited

UNITED STATES PATENTS 2,644,091   6/1953   Middlemark _____ 343—833

ELI LIEBERMAN, Primary Examiner

U.S. Cl. X.R.

343—833, 837